(12) United States Patent
Siegmeth et al.

(10) Patent No.: US 11,905,898 B2
(45) Date of Patent: Feb. 20, 2024

(54) EFFICIENT ENGINE START

(71) Applicant: The Boeing Company, Chicago, IL (US)

(72) Inventors: Jeffrey S. Siegmeth, Bothell, WA (US); David William Foutch, Seattle, WA (US); Bruce Van Deventer, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 347 days.

(21) Appl. No.: 16/721,820

(22) Filed: Dec. 19, 2019

(65) Prior Publication Data
US 2021/0189977 A1    Jun. 24, 2021

(51) Int. Cl.
*F02D 29/02* (2006.01)
*B64D 31/02* (2006.01)
*B64D 43/00* (2006.01)
*G08G 5/00* (2006.01)
*B64D 27/16* (2006.01)

(52) U.S. Cl.
CPC .......... *F02D 29/02* (2013.01); *B64D 27/16* (2013.01); *B64D 31/02* (2013.01); *B64D 43/00* (2013.01); *G08G 5/0065* (2013.01); *G08G 5/0082* (2013.01); *B64D 2221/00* (2013.01)

(58) Field of Classification Search
CPC ........ B64D 27/16; B64D 31/02; B64D 43/00; B64D 2221/00; B64D 31/06; F02D 29/02; F02C 7/26; F02C 9/28; G08G 5/0065; G08G 5/0082; G08G 5/0021
USPC .......................................................... 701/15
See application file for complete search history.

(56) References Cited

U.S. PATENT DOCUMENTS

| | | | |
|---|---|---|---|
| 10,235,892 B1 * | 3/2019 | Colligan | G08G 5/0043 |
| 2006/0086094 A1 * | 4/2006 | Runkle | F02C 9/26 60/734 |
| 2013/0057414 A1 * | 3/2013 | Nutaro | G08G 5/0021 340/958 |
| 2018/0118361 A1 * | 5/2018 | Choi | F02D 41/14 |
| 2018/0225976 A1 * | 8/2018 | Rinehart | G08G 5/025 |
| 2019/0213897 A1 * | 7/2019 | Jayathirtha | G08G 5/065 |
| 2020/0056546 A1 * | 2/2020 | Terwilliger | F02C 6/14 |
| 2020/0271011 A1 * | 8/2020 | Comandore | F01D 21/00 |

* cited by examiner

Primary Examiner — Geepy Pe
Assistant Examiner — Sean Patrick Reidy
(74) Attorney, Agent, or Firm — Yee & Associates, P.C.

(57) ABSTRACT

A method of automated timing of engine startup for an aircraft is provided. The method comprises receiving data inputs regarding a number of factors influencing a time to departure for the aircraft and receiving data inputs regarding a number of factors influencing time to start and set takeoff power for a number of engines on the aircraft. An engine startup countdown is calculated based on a comparison of a nominal time to departure with a nominal minimum time to start and set takeoff power for the engines, wherein the nominal time to departure is based on the first data inputs and the nominal minimum time to start and set takeoff power is based on the second data inputs. Upon completion of the countdown an engine start signal is sent.

24 Claims, 7 Drawing Sheets

EFFICIENT ENGINE START

BACKGROUND INFORMATION

1. Field

The present disclosure relates generally to aircraft and, more specifically, to a system for reducing jet engine start time prior to takeoff.

2. Background

While an aircraft is on the ground, movement of the aircraft is either performed by a tug or under the aircraft's own power. Towing and push-back of the aircraft is performed by a tug. Movement of the aircraft under its own power is called taxiing.

Currently, the timing of engine startup is left to the discretion of the pilot. Typically, engine startup is initiated at the gate or while being pushed back from the gate. The jet engines are then relied upon to taxi. During taxi, the aircraft's engines generate more energy than is used to propel the aircraft. In some instances, an aircraft waits to approach a destination within an airport such as a runway or a gate. As the aircraft waits, the aircraft idles with its engines running.

Therefore, it would be desirable to have a method and apparatus that take into account at least some of the issues discussed above, as well as other possible issues.

SUMMARY

An illustrative example of the present disclosure provides a method of automated timing of engine startup for an aircraft. The method comprises receiving data inputs regarding a number of factors influencing a time to departure for the aircraft and receiving data inputs regarding a number of factors influencing time required to start and set takeoff power for a number of engines on the aircraft. An engine startup countdown is calculated based on a comparison of a nominal time to departure with a nominal minimum time required to start and set takeoff power for the engines, wherein the nominal time to departure is based on the first data inputs and the nominal minimum time to start and set takeoff power is based on the second data inputs. Upon completion of the countdown an engine start signal is sent.

Another illustrative example provides a system for automated timing of engine startup for an aircraft. The system comprises a bus system, a storage device connected to the bus system, wherein the storage device stores program instructions, and a number of processors connected to the bus system, wherein the number of processors execute the program instructions to: receive first data inputs regarding a number of factors influencing a time to departure for the aircraft; receive second data inputs regarding a number of factors influencing time required to start and set takeoff power for a number of engines on the aircraft; calculate an engine startup countdown, wherein the countdown is based on a comparison of a nominal time to departure with a nominal minimum time required to start and set takeoff power for the engines, wherein the nominal time to departure is based on the first data inputs and the nominal minimum time to start and set takeoff power is based on the second data inputs; and upon completion of the countdown, send an engine start signal.

Another illustrative example provides a method for preparing an aircraft for departure. The method of comprises loading a payload onto the aircraft, performing a partial taxi to a point of departure with a number of engines on the aircraft turned off, receiving an engine start signal at a specified time before a nominal time of departure, wherein the specified time provides a minimum sufficient interval before departure to start and set takeoff power for the engines, and starting the engines in response to the start signal.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

Figure 1:
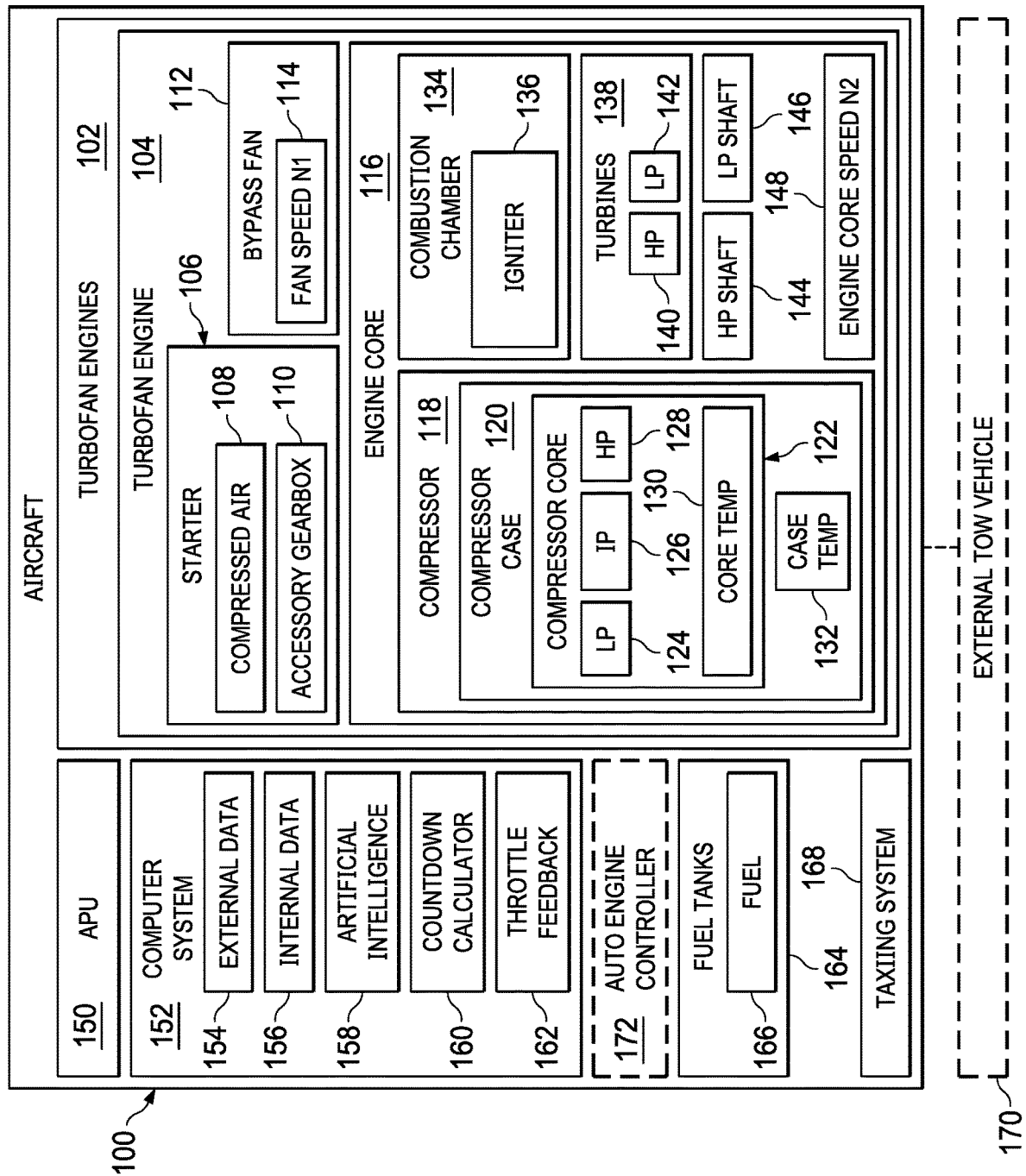
FIG. 1 is an illustration of a block diagram of an aircraft with an efficient engine start system in accordance with an illustrative example.

The illustrative examples recognize and take into account one or more different considerations. The illustrative examples recognize and take into account that as engines idle on an aircraft, fuel is expended. The illustrative examples recognize and take into account that it is desirable to reduce fuel waste for environmental and cost reasons. By reducing fuel waste, operating an aircraft is less expensive, fewer emissions are released for each flight, and non-renewable resources are conserved. In addition, by reducing engine idle/run time less noise is created at airports and less braking is required to counteract thrust created from idling/running engines, thereby reducing brake wear.

The illustrative examples recognize and take into account that fuel burn during taxiing can be a significant amount of fuel expenditures for an aircraft. By reducing fuel burn during taxiing, the fuel used by an aircraft is advantageously reduced.

The illustrative examples recognize and take into account that operating an aircraft engine produces engine noise and emissions. The illustrative examples recognize and take into account that it may be desirable to reduce the cumulative engine noise at an airport. The illustrative examples recognize and take into account that it may be desirable to reduce the cumulative emissions at an airport.

The illustrative examples recognize and take into account that jet engine startup is a multi-step procedure that is typically performed manually by the pilot. The illustrative examples also recognize and take into account that a minimal amount of startup time is necessary for a jet engine to reach idle speed and a specified operating temperature prior to setting takeoff power, where "specified operating temperature" means one of or a combination of: one or more air temperatures in the engine; one or more metal temperatures in the engine; exhaust gas temperature; and compressor case temperature, further where each temperature is based on a measurement and/or a calculation.

The illustrative examples provide an efficient engine start system for an aircraft that allows delay of startup closer in time to takeoff. A computer system concurrently calculates an estimated time to departure and a time to turn on the engines that is close enough to estimated takeoff to reduce unnecessary engine use but far enough in advance to enable reliable start and allow the engines to reach idle speed and a specified temperature before takeoff. This calculation takes multiple factors into account such as position of the aircraft relative to the runway, taxi speed, weather, engine temperature, etc.

In an illustrative example, the efficient start system provides an indication to the pilot to begin engine startup procedure at the calculated time before takeoff. In another illustrative example, quick start technology enables automatic engine startup in response to a signal from the computer system at the calculated time.

In an illustrative example, the efficient start system provides feedback to the throttle to avoid premature throttle up before the engine has reached the specified temperature for takeoff power, thereby ensuring a more efficient and reliable engine start.

Turning now to FIG. 1, an illustration of a block diagram of an aircraft with an efficient engine start system is depicted in accordance with an illustrative example. Aircraft 100 comprises a number of turbofan engines 102 and a computer system 152 that can calculate an engine startup time.

Each turbofan engine 104 among turbofan engines 102 comprises a bypass fan 112 and engine core 116. Bypass fan 114 produces a bypass airstream that flows around the engine core 116 and provides the majority of thrust in the case of a high-bypass turbofan engine. Engine core 116 produces exhaust thrust from fuel combustion, which is also used to generate power to turn bypass fan 114.

At the front of engine core 116 is compressor 118 that compresses intake air before it is mixed with fuel in combustion chamber 134. Compressor 118 comprises case 120 inside of which is the compressor core 122. Compressor core 122 comprises a number of compressor stages that can be grouped into low-pressure 124, intermediate-pressure 126, and high-pressure 128. As air moves through compressor stages 124, 126, 128 it is progressively compressed to higher pressure levels by each subsequent compressor stage.

Of particular importance for the present discussion, compressor case has a temperature 132 that might differ considerably from compressor core temperature 130, depending on the operational state of the turbofan engine 104. Because the compressor stages 124, 126, 128 comprise disks, blades, and drums, the compressor core 122 has more mass and therefore heats more slowly that the thinner compressor case 120. This differential between core temperature 130 and case temperature 132 is most pronounced during initial startup from a cold state, which can lead to problems during throttle up, discussed in more detail below.

Compressed air from compressor 118 enters combustion chamber 134, where it can be mixed with fuel 166 from fuel tanks 164 and ignited by igniter 136.

Exhaust from combustion chamber 134 passes through turbines 138 before exiting turbofan engine 104 as exhaust thrust. The expanding exhaust drives the rotation of high-pressure turbines 140 and low-pressure turbines 142. In the case of a multi-shaft turbofan engine, high-pressure turbines 142 rotate high-pressure shaft 142, which in turn rotates intermediate-pressure compressor stages 126 and high-pressure compressor stages 128. Low-pressure turbines 142 rotate low-pressure shaft 146, which in turn rotates bypass fan 112 and low-pressure compressor stages 124.

When a turbofan engine such as engine 104 is up to speed, the process of compressing air, combusting it with fuel, and using energy released from the combustion to continue compressing air via the turbines is a self-sustaining cycle. However, before turbofan engine 104 reaches self-sustaining speed, it needs help getting started.

Each turbofan engine 104 comprises a starter system 106 that initiates engine start and helps the engine 104 reach self-sustaining speed. Starter system 106 uses compressed air 108 to initiate rotation of compressor 118 through accessory gearbox 110. Compressed air 108 can be supplied from auxiliary power unit (APU) 150. Compressed air 108 can also be supplied as bleed air from another of engines 102 that is already started and up to operating speed.

Bypass fan 112 has a fan speed N1 162, and engine core 116 has an engine core speed N2 148, which refer to their respective rotational speeds (RPM). During engine startup, N2 148 has to reach a specified percentage of maximum speed, ensuring proper airflow through engine core 116 before igniter 136 is activated and fuel 166 is introduced into combustion chamber 134. N2 148 then reaches a higher percentage before turbofan engine 104 is self-sustaining, and starter system 106 can be turned off.

Computer system 152 can employ quick start technology to enable efficient startup of turbofan engines 102 prior to takeoff. Computer system 152 can be implemented in software, hardware, firmware or a combination thereof. When software is used, the operations performed by computer system 152 can be implemented in program code configured to run on hardware, such as a processor unit. When firmware is used, the operations performed by computer system 152 can be implemented in program code and data and stored in persistent memory to run on a processor unit. When hardware is employed, the hardware can include circuits that operate to perform the operations in computer system 152.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

When more than one data processing system is present in computer system 152, those data processing systems are in communication with each other using a communications medium. The communications medium can be a network. The data processing systems can be selected from at least one of a computer, a server computer, a tablet computer, or some other suitable data processing system.

Efficient startup timing reduces the time of engine startup before takeoff while still ensuring adequate time for efficient engine start. To calculate an engine start, computer system 152 uses a plurality of data comprising external data 154 and internal data 156.

External data 154 relate to information and conditions external to aircraft 100. Examples of external data 154 include weather conditions, global positioning system (GPS) position, schedules departure, runway selection, known takeoff priority, the position speed of other taxing aircraft received via automatic dependent surveillance broadcast (ADS-B), etc. Internal data 156 relate to information and conditions internal to aircraft 100.

Examples of internal data 156 include engine characteristics, type of start, engine conditions (temperature, etc.), current taxiing speed, etc.

Computer system 152 might also incorporate artificial intelligence (AI) 158 to assist in processes and interpreting external data 154 and internal data 156. AI 158 might be internal to computer system 152 inboard aircraft 100 or an external resource accessible by computer system 152 through a wireless communications link. AI 158 can correlate vast amounts of data that can potentially affect estimated departure time and engine startup time, including not only current external data 154 and internal data 156 but also historical data regarding air traffic at different airports, weather conditions, flight schedules and delays, etc., sometimes referred to "Big Data."

AI 158 is able to determine patterns within such Big Data and can correlate current external data 154 and internal data 156 to assist countdown calculator 160 in estimating an engine start time with an accuracy and precision not possible through manual calculation by a human pilot. A human pilot will almost invariably start the engines too soon, resulting in unnecessary fuel consumption, engine wear, emissions, and noise.

Computer system 152 might also include throttle feedback 162, which provides feedback to pilots to prevent attempts by the pilots to increase the throttle prematurely before the engine has reached a specified temperature.

Aircraft 100 might optionally include an automated engine controller 172 that can automatically initiate engine start in response to a signal from computer control system 152 at a calculated engine start time prior to estimated time of departure to ensure timing of engine start and warmup. Automatic engine controller 172 can also set engines 102 to takeoff power in response to a signal from computer control system 152 when the engines have reached a specified operating temperature for takeoff power.

Delay of engine start might be applied to all turbofan engines 102 on aircraft 100 or just one or more, depending on how aircraft 100 taxis on the ground. For example, many airlines use a single-engine-taxi procedure to save fuel while taxiing to the runway. The time to start the remaining engine(s) is dictated by the engine operation manual, which requires a certain time operating at idle speed prior to setting takeoff power. For example, the value might be three minutes at idle.

As an alternative to single-engine-taxi, aircraft 100 might optionally comprise an onboard taxiing system 168 that can propel aircraft 100 on the ground without energy from turbofan engines 102. As another option, an external tow vehicle 170 can provide pushback and towing of aircraft 100 on the ground.

In situations when taxiing is provided by an onboard taxiing system 168 or tow vehicle 170, delayed engine start can be applied to all turbofan engines 102 on aircraft 100 since none of them are needed for taxi.

The illustration of aircraft 100 in FIG. 1 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

Figure 2:
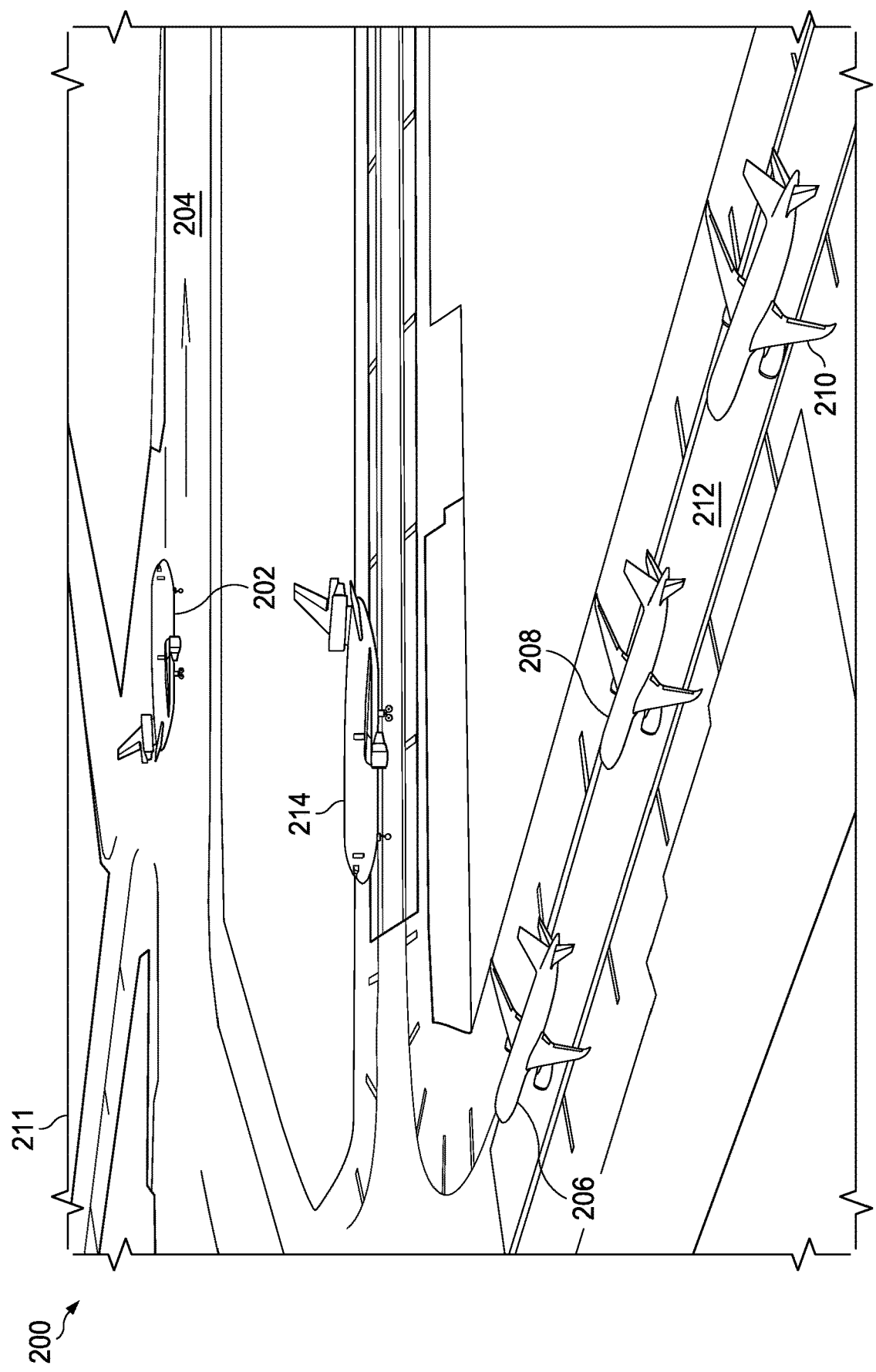
FIG. 2 is an illustration of a plurality of aircraft waiting to taxi to or from a runway in accordance with an illustrative example.

Turning now to FIG. 2, an illustration of a plurality of aircraft waiting to taxi to or from a runway is depicted in accordance with an illustrative example. In view 200, aircraft 202 is present on runway 204 and is preparing for takeoff. Aircraft 202, therefore, has its engines set to takeoff power.

Each of aircraft 206, aircraft 208, and aircraft 210 are present on taxiway 212 and are waiting to taxi to another location in airport 211. Aircraft 214 might be an aircraft that has just landed. Any of aircraft 202, 206, 208, 210, or 214 might be an example aircraft 100 shown in FIG. 1.

For aircraft 206, 208, and 210 on taxiway 212 to reduce fuel consumption during taxi to the runway 204, it is desirable to reduce the time needed between engine start and setting takeoff power. All things being equal, aircraft 206 should begin engine startup and set takeoff power before aircraft 208, and aircraft 208 in turn should start engines and set takeoff power before aircraft 210. Of course, things are rarely equal, and engine start times for aircraft 206, 208, and 210 can vary for a number of reasons including engine type and engine temperature.

Figure 3:
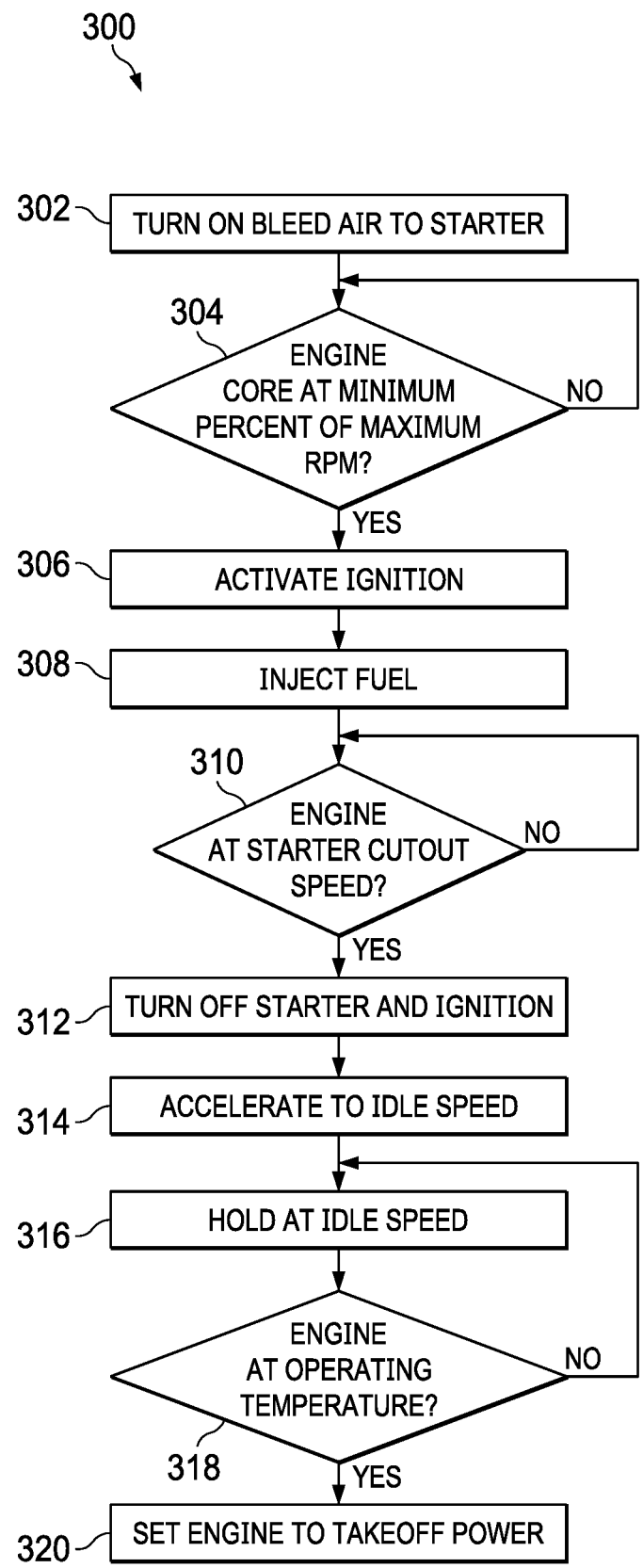
FIG. 3 depicts a flowchart for a process of starting a jet engine in accordance with an illustrative example.

FIG. 3 depicts a flowchart for a process of starting a jet engine in accordance with an illustrative example. Process 300 might be applied to a turbofan engine, such as turbofan engine 104 in FIG. 1, by a computer system such as computer system 152.

Process 300 begins with turning on compressed bleed air for the starter system (step 302). The bleed might be supplied by an APU such, as APU 150 in FIG. 1, or might be provided from another turbofan engine on the aircraft that is already at operational speed. The bleed air fed into the starter drives an accessory gearbox, which in turn begins rotating the compressors in the engine core.

The starter continues to increase the engine core speed N2 and determines when this speed reaches a specified minimum percentage of maximum RPM (step 304). In many jet engines, the required N2 is in the range of 15-25% of maximum, depending on the specific engine design. The minimum required percentage ensures that the airflow through the engine core is sufficient to prevent overheating of the combustion chamber when the fuel is ignited (i.e. "hot start"), which can damage the engine.

Once N2 reaches the specified minimum percentage of maximum, the igniter in the combustion chamber is activated (step 306), and fuel is injected into the combustion chamber to mix with the compressed air and ignite (step 308). Fuel combustion then begins contributing to rotating the turbines, thereby increasing engine core speed N2.

Initially, the energy released from combustion is not sufficient to make the compression and combustion cycle self-sustaining. Therefore, the starter system continues to assist the engine to increase core speed until N2 reaches self-sustainability. Many jet engines have a specified starter cutout speed for N2 that is slightly higher than self-sustaining speed. This cutout speed might be, for example, 55% of maximum N2. Therefore, after combustion is initiated, N2 is continually monitored until it reaches starter cutout speed (step 310).

Once the engine core speed N2 reaches starter cutout speed, the starter system and igniter are turned off (step 312). The engine then continues accelerating under its own self-sustaining power until it reaches idle speed (step 314). In many modern turbofan engines, idle speed is in the range of 60% of maximum N2.

After the engine reaches idle speed it should be held at idle for a sufficient time to allow the engine to reach specified starting temperature before setting takeoff power (step 316). One limitation that results in a minimum engine startup time is the danger of a stall of one of the axial compressors in the engine (e.g., low-pressure compressor, intermediate-pressure compressor, high-pressure compressor).

Figure 4:
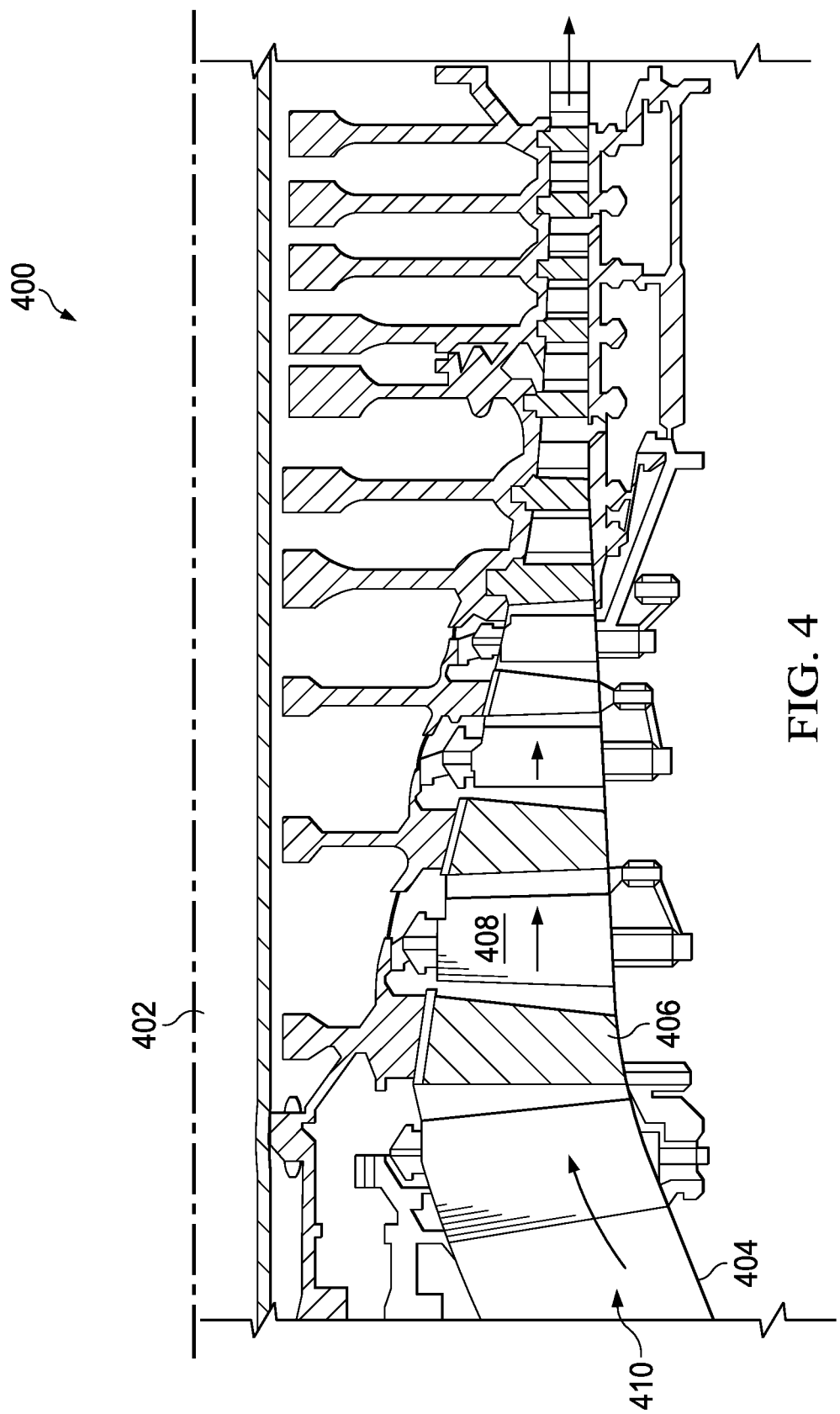
FIG. 4 illustrates a partial cross-section view of a turbofan engine compressors with which illustrative examples can be implemented.

FIG. 4 illustrates a partial cross-section view of a turbofan engine compressors with which illustrative examples can be implemented. Compressor 400 might be an example of compressor 118 in FIG. 1.

Compressor 400 comprises case 404 inside of which a number of rotor blades 406 rotate about a central shaft 402. Positioned between the rotor blades 406 are stator vanes 408.

The rotor blades 406 increase the speed of the air for the following stator vanes 408, which decrease the air speed and increase pressure. As compressor 400 compresses the air over subsequent stages, the air density increases, and the air takes up less place. Therefore, the compressor duct 410 gets narrower and the rotor blades 406 and stator vanes 408 become shorter. Air passing over the rotor blades 406 is flowing against an increasing pressure gradient as it moves through compressor 400. Therefore, rotors blades 406 are working against progressively increasing resistance. A typical pressure gain from one rotor/stator to the next is 30% or higher.

As explained briefly above, the compressor core (comprising rotor blades 406, disks, and drums) has more mass and warms up more slowly than the case 410, which is thin and has less mass. Because the compressor case 410 warms up more quickly than the core, it expands more quickly in the radial direction than rotor blades 406. As a result, the clearance gap between the end of the rotor blades 406 and the case 410 increases. If a sudden increase in engine acceleration occurs with the compressor in this uneven warmup state, the increased pressure gradient from downstream compressor stages can cause airflow back through the gaps between the blade tips and case, causing the rotor blades 406 to stall.

Referring back to FIG. 3, process 300 monitors engine function until the engine is at the proper operating temperature (step 318). This might occur through direct measurement of compressor temperature and/or indirectly through indicators of compressor function. If engine temperature is not yet at specified operating temperature, the engine is held at idle speed to prevent stall from premature throttle up.

Once the engine reaches operating temperature, it set to takeoff power (step 320).

Figure 5:
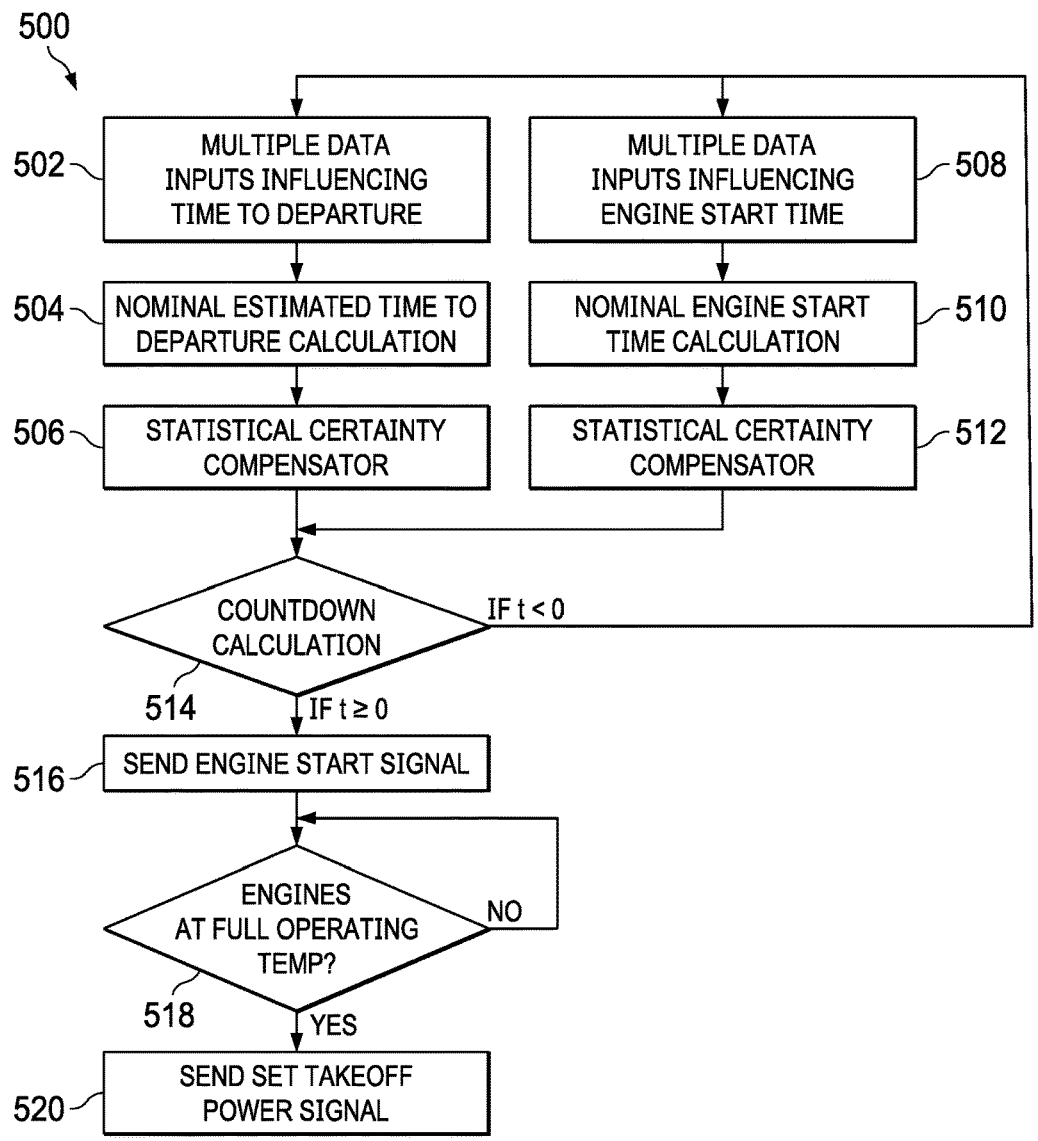
FIG. 5 depicts a flowchart for a process of reducing delay time between jet engine startup and takeoff in accordance with illustrative examples.

FIG. 5 depicts a flowchart for a process of reducing delay time between jet engine startup and takeoff in accordance with illustrative examples. Process 500 might be applied to a turbofan engine, such as turbofan engine 104 in FIG. 1, by a computer system such as computer system 152 applied to an engine startup process such as process 300 in FIG. 3.

Process 500 essentially comprises two concurrent calculations. One is a countdown until takeoff time. The other is a count-up from engines off to engines ready to set takeoff power. The goal of process 500 is to synchronize the countdown with the count-up as close as possible under real world operating conditions.

Process 500 begins with multiple data inputs regarding a number of factors influencing when the aircraft will be able to take off using best available data (step 502). These inputs include factors that affect the time it will take the aircraft in question to reach the point of takeoff and might comprise a combination of external data 154 and internal data 156. Example of such input factor include GPS position of the aircraft, taxiing speed of the aircraft, runway selection assigned to the aircraft, scheduled departure of the aircraft, current weather conditions, and known takeoff priority of the aircraft. Another possible input influencing time to departure comprises the GPS/GNSS (Global Navigation Satellite System) position and speed data of other taxiing aircraft at the airport received via ADS-B. ADS-B adds GPS/GNSS position data and ground speed to the digital code pulse time delay method of transponders used by airport secondary radar and by traffic collision avoidance systems (TCAS). Therefore, any transponder-equipped aircraft can maintain positional awareness of other on-ground, transponder-equipped aircraft in the vicinity on the same taxiway. The taxi speeds, and hence taxi times, of these other aircraft can be used in calculating departure time.

The computer system then calculates a nominal estimated time to departure (ETD) for the aircraft according to the data inputs of the departure factors (step 504). The ETD calculation can be made with assistance of Big Data and artificial intelligence such as AI 158 in FIG. 1. The current data input at step 502 can be correlated with historical data to determine a more accurate ETD. For example, if the aircraft is in Chicago in winter, and it begins snowing while the aircraft is taxiing, AI 158 can access historical data related to weather conditions and air traffic delays in Chicago and weigh current conditions against it to help calculate nominal ETD and the likelihood and probably length of delay.

The nominal ETD calculation is then fed into a statistical uncertainty compensator (step 506). The statistical uncertainty compensator provides a confidence margin interval for the nominal ETD calculation.

Concurrent with the ETD calculation process is the count-up to start the engines and get them ready to set takeoff power. This concurrent process begins with multiple data inputs regarding a number of factors influencing startup time for a number of engines on the aircraft using best available data (step 508). Examples of such factors include the model of the engines on the aircraft, the type of start required (e.g., cold start, warm start), engine conditions such as engine temperature as well as temperature and pressures at the compressor exit and entrance, and current weather conditions.

The computer system calculates a nominal minimal time required to start the engine(s) and set the engines to takeoff power according to the data inputs of factors influencing startup time (step 510). The computer system controlling engine startup can compute the time remaining before allowing takeoff power setting from a combination of real-time measurements and the recent history of the engine.

As an example of how the recent history of the engine could be used, on the first flight of the day the engine core will be at ambient temperature, so the compressor disks and drums may take a relatively long time to heat up and match the compressor case temperature sufficiently. But on a quick turnaround at a gate, the engines may be shut down for only 30 minutes. In this case the compressor disks and drums may take a relatively short time to heat up and match the compressor case temperature sufficiently.

As an example of the real-time measurements that the engine control might use, the pressure and temperature at the compressor exit (P3, T3) and entrance (P25, T25) are commonly available, as is the rotational speed of the compressor (N2). As another example, if the taxi operation includes operation at above-idle conditions, then the warmup time could be shorter. The engine control would account for this in its calculations and in the signals it sends to the aircraft.

Using a combination of the above example, the engine control computer would record the pressures, temperatures and rotor speeds experienced by the compressor, as well as the time the engine was shut down and started.

The method used by the engine control computer to calculate the time remaining before setting takeoff power could be based on empirical correlations of the input parameters to the time remaining or could be based on a real-time model of compressor tip clearances derived from the input parameters. As with the ETD calculation, the engine start time calculation can take advantage of Big Data regarding operational histories of similar model engines. This historical data can be correlated with current and recent history of the engine in question.

Other time-based limitations beyond compressor stall might also affect the engine's ability to operate at takeoff power. For example, engine start up time might be limited to prevent thermal stresses in the engine turbines. In cases in which there are multiple limitations on engine start time the control computer can calculate the earliest allowable time for each limitation, then report the longest time to the aircraft.

The engine startup time calculation is then fed into its own statistical certainty compensator, which calculates a confidence margin for the nominal startup time (step 512). Because the consequence of having to wait to set takeoff power is higher than the consequence of an undesirable idle time (e.g., the aircraft waits on the runway until engine is ready, delaying other traffic versus somewhat higher fuel consumption), the calculations would bias the predicted time for setting takeoff power to account for uncertainties and errors. This could be expressed as a confidence interval, for example: The recommended time for setting takeoff power is in 33 seconds; there is a 1% chance that it could be as long as 38 seconds and a 0.1% chance that it could be as long as 45 seconds.

The results of the estimated TED and engine start time are then fed into a countdown calculator such as countdown calculator 160 in FIG. 1. The countdown calculator calculates an engine startup countdown based on a comparison of the nominal time to departure with the nominal minimum time required to start the engines and set takeoff power to determine the time to begin engine start within the respective degrees of confidence (step 514).

Prior to completion of the countdown, the system continues an iterative loop of updating the nominal time to departure, the nominal minimum time required to start the engines and set takeoff power and reviving the countdown according to continually updated new input data. Upon completion of the countdown, the control computer sends an engine start signal (step 516). This start signal might be sent to the flight crew of the aircraft or sent to an automatic engine controller such as controller 172.

If changes in input data lead to significant changes it ETD, the engine controller can adjust its idle setting to meet that time. For example, if the ETD changes to sooner than predicted, the controller can set a higher idle speed so that the compressor will warm up more quickly. Alternatively, if a delay causes the ETD to be later than predicted, the engine control could reduce the idle setting.

After engine start, the system monitors engine temperature to determine when the engines reach the specified operating temperature to set takeoff power (step 518). The computer controller can provide a signal to the aircraft to communicate the time remaining before takeoff power can be set. A second signal could indicate the maximum allowed throttle position that can be set while the engines warm up to a temperature required to set takeoff power. These signals would be updated frequently, e.g., twice per second. The aircraft can use these signals to display the time remaining to the crew and/or show the limit of allowed throttle position on the engine control display of the flight deck.

Figure 6:
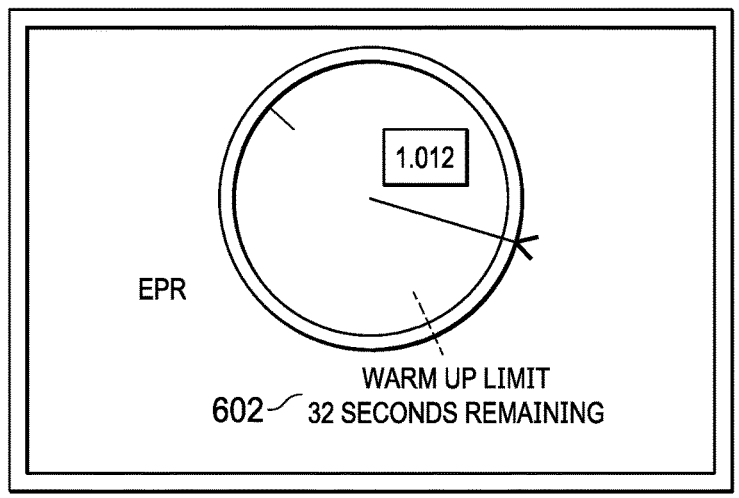
FIG. 6 depicts an engine power setting gauge with warm up limit in accordance with an illustrative example.

FIG. 6 depicts an example of an engine power setting gauge with active warmup limit. Gauge 600 in an example of a display provided to the crew in response to the start signal from step 520 in FIG. 5. In this example gauge 600 displays a warmup limit 602 and time remaining of 32 second before setting takeoff power.

The computer system might automatically limit throttle motion to the maximum allowed throttle position. Alternately, the throttle could provide a high mechanical resistance to crew movement of the throttle lever as feedback to indicate that the engine is not ready for an acceleration but would not prevent throttle motion.

When the engines reach the specific operating temperature to set takeoff power, the system sends a set takeoff power signal (step 520). Again, this signal might be sent to the flight crew of the aircraft or sent to an automatic engine controller such as controller 172.

Figure 7:
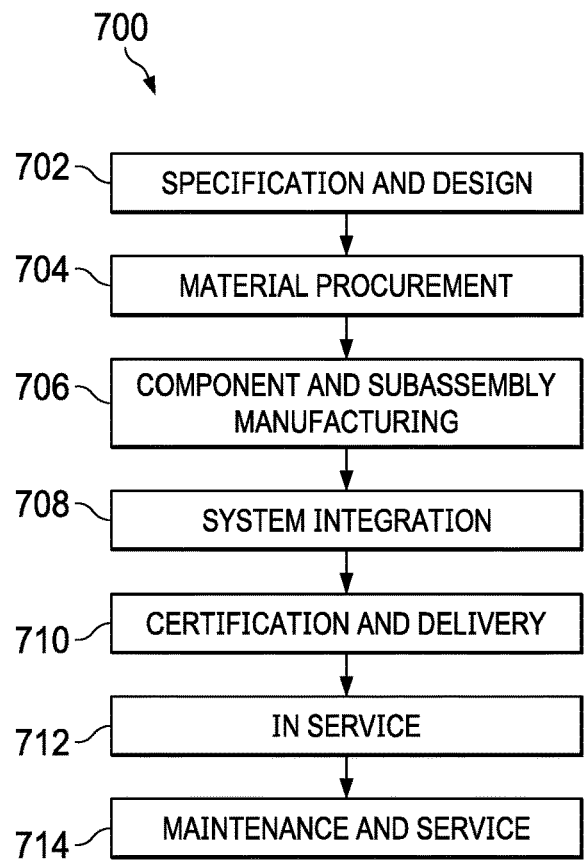
FIG. 7 is an illustration of an aircraft manufacturing and service method in a form of a block diagram in accordance with an illustrative example.
Figure 8:
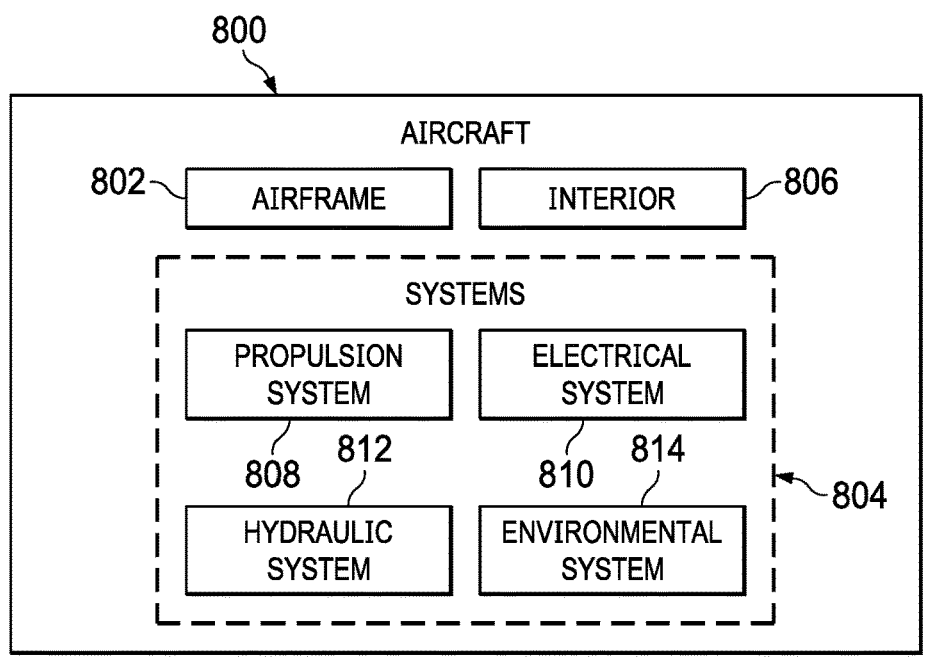
FIG. 8 is an illustration of an aircraft in a form of a block diagram in which an illustrative example may be implemented.

Illustrative examples of the present disclosure may be described in the context of aircraft manufacturing and service method 700 as shown in FIG. 7 and aircraft 700 as shown in FIG. 8. Turning first to FIG. 7, an illustration of an aircraft manufacturing and service method is depicted in accordance with an illustrative example. During pre-production, aircraft manufacturing and service method 700 may include specification and design 702 of aircraft 800 in FIG. 8 and material procurement 704.

During production, component and subassembly manufacturing 706 and system integration 708 of aircraft 800 takes place. Thereafter, aircraft 800 may go through certification and delivery 710 in order to be placed in service 712. While in service 712 by a customer, aircraft 800 is scheduled for routine maintenance and service 714, which may include modification, reconfiguration, refurbishment, or other maintenance and service.

Each of the processes of aircraft manufacturing and service method 700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 8, an illustration of an aircraft is depicted in which an illustrative example may be implemented. In this example, aircraft 800 is produced by aircraft manufacturing and service method 500 of FIG. 7 and may include airframe 802 with plurality of systems 804 and interior 806. Examples of systems 804 include one or more of propulsion system 808, electrical system 810, hydraulic system 812, and environmental system 814. Any number of other systems may be included. Although an aerospace example is shown, different illustrative examples may be applied to other industries, such as the automotive industry.

Apparatuses and methods embodied herein may be employed during at least one of the stages of aircraft manufacturing and service method 700. One or more illustrative examples may be manufactured or used during at least one of component and subassembly manufacturing 706, system integration 708, in service 712, or maintenance and service 714 of FIG. 7.

The illustrative examples might provide a taxiing system for an aircraft. By employing the taxiing system, the aircraft may taxi without running the aircraft engines. The illustrative examples reduce the fuel consumed during taxiing of the aircraft. The illustrative examples reduce the fuel emissions generated by an aircraft during taxiing.

Figure 9:
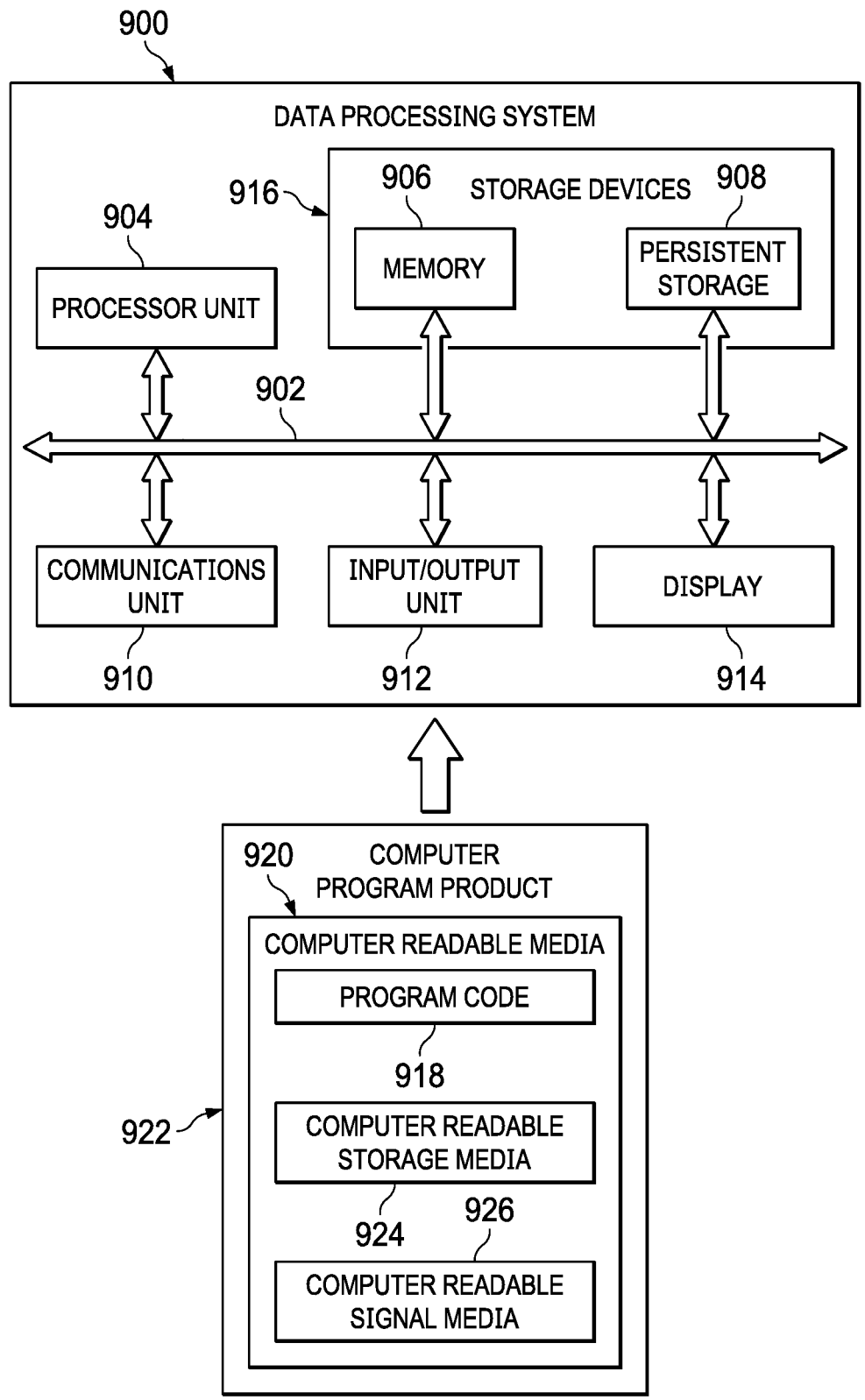
FIG. 9 depicts a block diagram of a data processing system in accordance with an illustrative example.

Turning now to FIG. 9, an illustration of a block diagram of a data processing system is depicted in accordance with an illustrative example. Data processing system might be an example of computer system 152 in FIG. 1. Data processing system 900 might be used to implement one or more computers to carry out the process steps shown in FIGS. 3 and 5. In this illustrative example, data processing system 900 includes communications framework 902, which provides communications between processor unit 904, memory 906, persistent storage 908, communications unit 910, input/output unit 912, and display 914. In this example, communications framework 902 may take the form of a bus system.

Processor unit 904 serves to execute instructions for software that may be loaded into memory 906. Processor unit 904 may be a number of processors, a multi-processor core, or some other type of processor, depending on the particular implementation. In an example, processor unit 904 comprises one or more conventional general-purpose central processing units (CPUs). In an alternate example, processor unit 904 comprises a number of graphical processing units (GPUs).

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908. Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different examples may be performed by processor unit 904 using computer-implemented instructions, which may be located in a memory, such as memory 906.

These instructions are referred to as program code, computer-usable program code, or computer-readable program code that may be read and executed by a processor in processor unit 904. The program code in the different examples may be embodied on different physical or computer-readable storage media, such as memory 906 or persistent storage 908.

Program code 918 is located in a functional form on computer-readable media 920 that is selectively removable and may be loaded onto or transferred to data processing system 900 for execution by processor unit 904. Program code 918 and computer-readable media 920 form computer program product 922 in these illustrative examples. In one example, computer-readable media 920 may be computer-readable storage media 924 or computer-readable signal media 926.

In these illustrative examples, computer-readable storage media 924 is a physical or tangible storage device used to store program code 918 rather than a medium that propagates or transmits program code 918. Alternatively, program code 918 may be transferred to data processing system 900 using computer-readable signal media 926.

Computer-readable signal media 926 may be, for example, a propagated data signal containing program code 918. For example, computer-readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different examples may be implemented. The different illustrative examples may be implemented in a data processing system including components in addition to or in place of those illustrated for data processing system 900. Other components shown in FIG. 9 can be varied from the illustrative examples shown. The different examples may be implemented using any hardware device or system capable of running program code 918.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted examples illustrate the architecture, functionality, and operation of some possible implementations of apparatuses and methods in an illustrative example. In this regard, each block in the flowcharts or block diagrams may represent at least one of a module, a segment, a function, or a portion of an operation or step. For example, one or more of the blocks may be implemented as program code.

In some alternative implementations of an illustrative example, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative examples has been presented for purposes of illustration and description and is not intended to be exhaustive or limited to the examples in the form disclosed. Many modifications and variations will be apparent to those of ordinary skill in the art. Further, different illustrative examples may provide different features as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

Clause 1: A method comprising receiving, by a processor, first data inputs regarding factors influencing a time to departure for an aircraft; receiving, by the processor, second data inputs regarding factors influencing time to start and set takeoff power for at least one engine on the aircraft; calculating, by the processor, an engine startup countdown, wherein the engine startup countdown is based on a comparison of a nominal time to departure with a nominal minimum time to start and set takeoff power for the engines, wherein the nominal time to departure is based on the first data inputs and the nominal minimum time to start and set takeoff power is based on the second data inputs; and upon completion of the engine startup countdown, sending, by the processor, an engine start signal.

Clause 2: The method of Clause 1, further comprising, prior to completion of the countdown, iteratively: updating, by the processor, the nominal time to departure according to new first data inputs; updating, by the processor, the nominal minimum time to start and set takeoff power according to new second data inputs; and revising, by the processor, the engine startup countdown according to the new first and second data inputs.

Clause 3: The method of Clause 1 or 2, wherein the engine start signal is sent to at least one of a flight crew of the aircraft or an automatic engine controller.

Clause 4: The method of any of Clauses 1-3, further comprising sending a set takeoff power signal when the engines reach a specified operating temperature.

Clause 5: The method of any of Clauses 1-4, wherein the set takeoff power signal is sent to at least one of a flight crew of the aircraft or an automatic engine controller.

Clause 6: The method of any of Clauses 1-5, wherein factors influencing the time to departure comprise at least one of: GPS position of the aircraft; taxiing speed of the aircraft; runway selection assigned to the aircraft; scheduled departure of the aircraft; current weather conditions; known takeoff priority of the aircraft; or position and speed data of other taxiing aircraft received via automatic dependent surveillance broadcast.

Clause 7: The method of any of Clauses 1-6, wherein the factors influencing engine startup and time to set takeoff power comprise at least one of: model of the engines on the aircraft; type of start; engine temperature; temperature and pressures at a compressor exit; temperature and pressures at a compressor entrance; or current weather conditions.

Clause 8: The method of any of Clauses 1-7, further comprising calculating, by the processor, a confidence margin for nominal time to departure and/or the nominal minimum time to start the engines and set takeoff power.

Clause 9: The method of any of Clauses 1-8, further comprising indicating, by the processor, a maximum allowed throttle position that can be set while the engines warm up to a temperature associated with set takeoff power.

Clause 10: The method of Clause 9, further comprising at least one of: showing the maximum allowed throttle position on a display; automatically limiting throttle motion to the maximum allowed throttle position; or providing mechanical resistance to throttle movement as feedback to indicate that the engines are not ready for an acceleration.

Clause 11: The method of any of Clauses 1-10, wherein at least one of nominal time to departure or the nominal minimum time to start the engines and set takeoff power is calculated by correlating the first data inputs and second data inputs to historical data.

Clause 12: A system comprising a bus system; a storage device connected to the bus system, wherein the storage device stores program instructions; and a processor connected to the bus system, wherein the processor executes the program instructions to: receive first data inputs regarding factors influencing a time to departure for the aircraft; receive second data inputs regarding factors influencing time to start and set takeoff power for at least one engine on the aircraft; calculate an engine startup countdown, wherein the countdown is based on a comparison of a nominal time to departure with a nominal minimum time to start and set takeoff power for the engines, wherein the nominal time to departure is based on the first data inputs and the nominal minimum time to start and set takeoff power is based on the second data inputs; and upon completion of the engine startup countdown, send an engine start signal.

Clause 13: The system of Clause 12, wherein, prior to completion of the countdown, the processor further executes instructions to iteratively update the nominal time to departure according to new first data inputs; update the nominal minimum time to start and set takeoff power according to new second data inputs; and revise the engine startup countdown according to the new first and second data inputs.

Clause 14: The system of Clause 12 or 13, wherein the engine start signal is sent to at least one of a flight crew of the aircraft or an automatic engine start controller.

Clause 15: The system of any of Clauses 12-14, wherein the processors further execute instructions to send a set takeoff power signal when the engines reach a specified operating temperature.

Clause 16: The system of Clause 15, wherein the set takeoff power signal is sent to at least one of a flight crew of the aircraft or an automatic engine controller.

Clause 17: The system of any of Clauses 12-16, wherein factors influencing time to departure comprise at least one of: GPS position of the aircraft; taxiing speed of the aircraft; runway selection assigned to the aircraft; scheduled departure of the aircraft; current weather conditions; known takeoff priority of the aircraft; or position and speed data of other taxiing aircraft received via automatic dependent surveillance broadcast.

Clause 18: The system of any of Clauses 12-17, wherein the factors influencing engine startup and time to set takeoff power comprise at least one of: model of the engines on the aircraft; type of start; engine temperature; temperature and pressures at a compressor exit; temperature and pressures at a compressor entrance; or current weather conditions.

Clause 19: The system of any of Clauses 12-18, wherein the processor further executes instructions to calculate a confidence margin for nominal time to departure and/or the nominal minimum time to start the engines and set takeoff power.

Clause 20: The system of any of Clauses 12-19, wherein the processor further executes instructions to indicate a maximum allowed throttle position that can be set while the engines warm up to a temperature to set takeoff power.

Clause 21: The system of Clause 20, wherein the processor further executes instructions to at least one of: show the maximum allowed throttle position on a display; automatically limit throttle motion to the maximum allowed throttle position; or provide mechanical resistance to throttle movement as feedback to indicate that the engines are not ready for an acceleration.

Clause 22: The system of any of Clauses 12-21, wherein at least one of the nominal time to departure or the nominal minimum time to start the engines and set takeoff power is calculated by correlating the first data inputs and second data inputs to historical data.

Clause 23: A method comprising loading a payload onto an aircraft; performing a partial taxi to a point of departure with an engine on the aircraft turned off; receiving an engine start signal at a specified time before a nominal time of departure, wherein the specified time provides a minimum interval before departure to start and set takeoff power for the engine; and starting the engine in response to the engine start signal.

Clause 24: The method of Clause 23, wherein the engine start signal is received by at least one of a flight crew of the aircraft or an automatic engine controller.

Clause 25: The method of Clause 23 or 24, further comprising: receiving a set takeoff power signal when the engine reaches a specified operating temperature; and setting takeoff power for the engine in response to the set takeoff power signal.

Clause 26: The method of Clause 25, wherein the set takeoff power signal is received by at least one of a flight crew of the aircraft or an automatic engine controller.

Clause 27: A computer program product for automated timing of engine startup for an aircraft, the computer program product comprising: a non-volatile computer readable storage medium having program instructions embodied therewith, the program instructions executable by a processor to cause a computer to: receive first data inputs regarding factors influencing a time to departure for the aircraft; receiving second data inputs regarding factors influencing time to start and set takeoff power for an engine on the aircraft; calculating an engine startup countdown, wherein the countdown is based on a comparison of a nominal time to departure with a nominal minimum time to start and set takeoff power for the engines, wherein the nominal time to departure is based on the first data inputs and the nominal minimum time to start and set takeoff power is based on the second data inputs; and upon completion of the engine startup countdown, sending an engine start signal.

Clause 28: The computer program product of Clause 28, further comprising instructions for sending a set takeoff power signal when the engine reaches a specified operating temperature.

What is claimed is:

1. A method of starting a turbofan engine, the method comprising:
    receiving, by a processor in a computer system, first data inputs regarding factors influencing a time to departure for an aircraft; receiving, by the processor, second data inputs regarding factors influencing time to start and set takeoff power for at least one turbofan engine on the aircraft, wherein the second data inputs include engine temperature, temperature and pressures at a compressor exit, and temperature and pressures at a compressor entrance;
    calculating, by the processor, an engine startup countdown, wherein the engine startup countdown is based on a comparison of a nominal time to departure with a nominal minimum time to start and set takeoff power for the turbofan engine, and wherein the nominal time to departure is based on the first data inputs and the nominal minimum time to start and set takeoff power is based on the second data inputs; upon completion of the engine startup countdown, sending, by the processor, an engine start signal to an automated engine controller;
    initiating, by the automated engine controller, engine start of the turbofan engine in response to the start signal; and indicating a maximum allowed throttle position that can be set while the engines warm up to a temperature associated with set takeoff power.

2. The method of claim 1, further comprising, prior to completion of the countdown, iteratively: updating, by the processor, the nominal time to departure according to new first data inputs; updating, by the processor, the nominal minimum time to start and set takeoff power according to new second data inputs; and revising, by the processor, the engine startup countdown according to the new first and second data inputs.

3. The method of claim 1, further comprising sending a set takeoff power signal to the automated engine controller when the engines reach a specified operating temperature.

4. The method of claim 1, wherein factors influencing the time to departure comprise at least one of: GPS position of the aircraft; taxiing speed of the aircraft; runway selection assigned to the aircraft; scheduled departure of the aircraft; current weather conditions; known takeoff priority of the aircraft; or position and speed data of other taxiing aircraft received via automatic dependent surveillance broadcast.

5. The method of claim 1, wherein the factors influencing engine startup and time to set takeoff power further comprise at least one of: model of the engines on the aircraft; type of start; or current weather conditions.

6. The method of claim 1, further comprising calculating, by the processor, a confidence margin for nominal time to departure and/or the nominal minimum time to start the engines and set takeoff power.

7. The method of claim 1, further comprising at least one of: showing the maximum allowed throttle position on a display; automatically limiting throttle motion to the maximum allowed throttle position; or providing mechanical resistance to resist movement of a throttle lever, by a crew member, as feedback to indicate that the engines are not ready for an acceleration.

8. The method of claim 1, wherein at least one of: the nominal time to departure is calculated by correlating the first data inputs to historical data; or the nominal minimum time to start the engines and set takeoff power is calculated by correlating the second data inputs to historical data.

9. A system for starting a turbofan engine, the system comprising: a bus system; a storage device connected to the bus system, wherein the storage device stores program instructions; and a processor connected to the bus system, wherein the processor executes the program instructions to: receive first data inputs regarding factors influencing a time to departure for an aircraft; receive second data inputs regarding factors influencing time to start and set takeoff power for at least one turbofan engine on the aircraft, wherein the second data inputs include engine temperature, temperature and pressures at a compressor exit, and temperature and pressures at a compressor entrance; calculate an engine startup countdown, wherein the countdown is based on a comparison of a nominal time to departure with a nominal minimum time to start and set takeoff power for the turbofan engine, and wherein the nominal time to departure is based on the first data inputs and the nominal minimum time to start and set takeoff power is based on the second data inputs; upon completion of the engine startup countdown, send an engine start signal to an automated engine controller; initiate, by the automated engine controller, engine start of the turbofan engine in response to the start signal; and indicate a maximum allowed throttle position that can be set while the engines warm up to a temperature associated with set takeoff power.

10. The system of claim 9, wherein, prior to completion of the countdown, the processor further executes instructions to iteratively: update the nominal time to departure according to new first data inputs; update the nominal minimum time to start and set takeoff power according to new second data inputs; and revise the engine startup countdown according to the new first and second data inputs.

11. The system of claim 9, wherein the processors further execute instructions to send a set takeoff power signal to the automated engine controller when the engines reach a specified operating temperature.

12. The system of claim 9, wherein factors influencing time to departure comprise at least one of: GPS position of the aircraft; taxiing speed of the aircraft; runway selection assigned to the aircraft; scheduled departure of the aircraft; current weather conditions; known takeoff priority of the aircraft; or position and speed data of other taxiing aircraft received via automatic dependent surveillance broadcast.

13. The system of claim 9, wherein the factors influencing engine startup and time to set takeoff power further comprise at least one of: model of the engines on the aircraft; type of start; or current weather conditions.

14. The system of claim 9, wherein the processor further executes instructions to calculate a confidence margin for nominal time to departure and/or the nominal minimum time to start the engines and set takeoff power.

15. The system of claim 9, wherein the processor further executes instructions to at least one of: show the maximum allowed throttle position on a display; automatically limit throttle motion to the maximum allowed throttle position; or
provide mechanical resistance to resist movement of a throttle lever, by a crew member, as feedback to indicate that the engines are not ready for an acceleration.

16. The system of claim 9, wherein at least one of: the nominal time to departure is calculated by correlating the first data inputs to historical data; or the nominal minimum time to start the engines and set takeoff power is calculated by correlating the second data inputs to historical data.

17. A method, comprising: performing a partial taxi of an aircraft to a point of departure with an engine on the aircraft turned off, sending, by a processor, an engine start signal to an automated engine controller at a specified time before a nominal time of departure, wherein the specified time provides a minimum interval before departure to start and set takeoff power for the engine, wherein the nominal time of departure is based on first data inputs regarding factors influencing a time to departure for the aircraft, wherein a nominal minimum time to start and set takeoff power is based on second data inputs influencing time to start and set takeoff power for at least one engine on the aircraft, and wherein the second data inputs include engine temperature, temperature and pressures at a compressor exit, and temperature and pressures at a compressor entrance; starting, by the automated engine controller, the engine in response to the engine start signal; and indicating a maximum allowed throttle position that can be set while the engines warm up to a temperature associated with set takeoff power.

18. The method of claim 17, further comprising: receiving a set takeoff power signal when the engine reaches a specified operating temperature; and setting takeoff power for the engine in response to the set takeoff power signal.

19. The method of claim 8, wherein the historical data includes operational histories of similar model engines.

20. The method of claim 19, wherein the operational histories of similar model engines are correlated with recent history of the turbofan engine being started.

21. The system of claim 16, wherein the historical data includes operational histories of similar model engines.

22. The system of claim 21, wherein the operational histories of similar model engines are correlated with recent history of the turbofan engine being started.

23. The method of claim 17, wherein factors influencing time to departure comprise at least one of: GPS position of the aircraft; taxiing speed of the aircraft; runway selection assigned to the aircraft; scheduled departure of the aircraft; current weather conditions; known takeoff priority of the aircraft; or position and speed data of other taxiing aircraft received via automatic dependent surveillance broadcast.

24. The method of claim 17, wherein the factors influencing engine startup and time to set takeoff power further comprise at least one of: model of the engines on the aircraft; type of start; or current weather conditions.

\* \* \* \* \*